US006611100B1

(12) United States Patent
Moore

(10) Patent No.: US 6,611,100 B1
(45) Date of Patent: Aug. 26, 2003

(54) REFLECTIVE ELECTRO-OPTIC FIBER-BASED DISPLAYS WITH BARRIERS

(76) Inventor: Chad Byron Moore, 7 W. 4$^{th}$ St., Corning, NY (US) 14830

(*) Notice: Subject to any disclaimer, the term of this patent is extended or adjusted under 35 U.S.C. 154(b) by 481 days.

(21) Appl. No.: 09/621,193

(22) Filed: Jul. 21, 2000

Related U.S. Application Data

(63) Continuation-in-part of application No. 09/517,759, filed on Mar. 2, 2000, now Pat. No. 6,459,200, which is a continuation-in-part of application No. 09/299,372, filed on Apr. 26, 1999, now Pat. No. 6,452,332.

(51) Int. Cl.$^7$ ............................................... H01J 17/49
(52) U.S. Cl. ..................... 313/582; 313/495; 313/587; 313/497; 349/84; 349/85; 349/89
(58) Field of Search ................................ 313/582, 113, 313/586, 583, 584; 345/37, 41, 60; 349/84, 85, 86, 89

(56) References Cited

U.S. PATENT DOCUMENTS

| | | | |
|---|---|---|---|
| 2,209,747 A | 7/1940 | Eisler ......................... | 178/6.5 |
| 3,521,941 A | 7/1970 | Deb et al. ................... | 350/160 |
| 3,767,392 A | 10/1973 | Ota ................................ | 96/1 |
| 3,964,050 A | 6/1976 | Mayer ......................... | 340/324 |
| 4,027,188 A | 5/1977 | Bergman .................... | 313/220 |
| 4,038,577 A | 7/1977 | Bode et al. .................. | 313/188 |
| 4,126,854 A | 11/1978 | Sheridon .................... | 340/373 |
| 4,203,106 A | 5/1980 | Dalisa et al. ................ | 340/787 |
| 4,554,537 A | 11/1985 | Dick ............................ | 340/775 |

(List continued on next page.)

FOREIGN PATENT DOCUMENTS

| | | | |
|---|---|---|---|
| JP | 10149763 | 2/1998 | ............ H01J/9/02 |
| JP | 11003649 | 6/1999 | ............ H01J/9/02 |

OTHER PUBLICATIONS

Kishi, E. et al, 2000, "5.1: Development of In–Plane EPD", SID 00 Digest, pp 24–27.
Dick, G. W. "Three–Electrode per PEL AC Plasma Display Panel", 1985 International Display Research Conf., pp 45–50.
Mayer, W. 1972, "Tubular AC Plasma Panels", IEEE Conf. Display Devices, Conf. Rec., New York, pp 15–18.
Storm, R., 1974, "32–inch Graphic Plasma Display Module", SID Int. Symposium, San Diego, pp 122–123.
Moore, C. et al, "Fiber Plasma Display", SID '97 Digest, pp. 1055–1058.

(List continued on next page.)

*Primary Examiner*—Vip Patel
*Assistant Examiner*—Mariceli Santiago
(74) *Attorney, Agent, or Firm*—Brown & Michaels PC

(57) ABSTRACT

An electronic display is formed using an array of hollow tubes filled with an electrophoretic material sandwiched between two plates. The hollow tubes have either barrier walls or an electrostatic barrier, which restrict the flow of electrophoretic particles within the hollow tubes. The flow of electrophoretic particles over these barriers is controlled using electric fields, which makes it possible to matrix address the electrophoretic displays. Wire electrodes built into the hollow tubes and electrodes on the two plates are used to address the display. The plates are preferably composed of glass, glass-ceramic, polymer/plastic or metal, while the hollow tubes are preferably composed of glass, polymer/plastic or a combination of glass and polymer/plastic. Color is optionally imparted into the display using colored tubes, adding a color coating to the surface of the tubes, or adding the color to the electrophoretic material. Reflectivity within the display is accomplished by using a reflective material to fabricate the tubes, coating the tubes with a reflective material or coating one of the two plates with a reflective material. The display can also function in a transmissive mode by applying an illuminating back to the display.

47 Claims, 16 Drawing Sheets

U.S. PATENT DOCUMENTS

| | | | |
|---|---|---|---|
| 4,717,949 A | 1/1988 | Eichenlaub | 358/3 |
| 4,728,864 A | 3/1988 | Dick | 315/169.3 |
| 4,833,463 A | 5/1989 | Dick et al. | 340/775 |
| 4,896,149 A | 1/1990 | Buzak et al. | 340/794 |
| 5,036,317 A | 7/1991 | Buzak | 340/783 |
| 5,077,553 A | 12/1991 | Buzak | 340/794 |
| 5,086,297 A | 2/1992 | Mjyake et al. | 340/759 |
| 5,272,472 A | 12/1993 | Buzak | 345/60 |
| 5,313,423 A | 5/1994 | Sato et al. | 365/200 |
| 5,345,251 A | 9/1994 | DiSanto et al. | 345/107 |
| 5,440,201 A | 8/1995 | Martin et al. | 313/582 |
| 5,446,344 A | 8/1995 | Kanazawa | 315/169.4 |
| 5,457,574 A | 10/1995 | Eichenlaub | 359/619 |
| 5,661,500 A | 8/1997 | Shinoda et al. | 345/60 |
| 5,674,553 A | 10/1997 | Shinoda et al. | 427/68 |
| 5,739,801 A | 4/1998 | Sheridon | 345/84 |
| 5,745,086 A | 4/1998 | Weber | 345/63 |
| 5,790,086 A | 8/1998 | Zelitt | 345/32 |
| 5,838,494 A | 11/1998 | Araki | 359/455 |
| 5,961,804 A | 10/1999 | Jacobson | 204/606 |
| 5,984,747 A | 11/1999 | Bhagavatula et al. | 445/24 |
| 6,459,200 B1 * | 10/2002 | Moore | 313/582 |

OTHER PUBLICATIONS

Trotter, D. M. et al, "PALC Displays Made From Electroded Glass Fiber Arrays", SID '97 Digest, pp. 379–382.

Weber et al, 1996, "Materials and Manufacturing Issues of Color Plasma Displays", MRS Bulletin, 65, 1996.

Mikoshiba, Shigeo, SID Int. Symp. Seminar Lectaure Notes, M–4, 1998.

Koiwa et al, 1995, Preparation of MgO Protective Layer for AC–Type Plasma Display Panel by Means of Screen–Printing; J. Electrochem. Soc., vol. 142, No. 5, pp. 1396–1401.

Koiwa et al, 1996, MgO Powders for Protective Layer of Alternating Current Plasma Display Panel, Electronics and Communications in Japan, Part 2, vol. 79, No. 4, pp. 55–66.

Koiwa, I., 1996, "A Study on MgO pOwder and MgO Liquid Binder in the Screen–Printed Protective Layer for AC–PDPs" IEICE Trans. Electron. vol. E79–C, No. 4, pp 580–585.

* cited by examiner

REFLECTIVE ELECTRO-OPTIC FIBER-BASED DISPLAYS WITH BARRIERS

REFERENCE TO RELATED APPLICATIONS

This is a continuation-in-part of U.S. patent application Ser. No. 09/517,759, filed Mar. 2, 2000, now U.S. Pat. No. 6,459,200 entitled REFLECTIVE ELECTRO-OPTIC FIBER-BASED DISPLAYS, which is a continuation-in-part of U.S. patent application Ser. No. 09/299,372, filed Apr. 26, 1999, now U.S. Pat. No. 6,452,332 entitled FIBER-BASED PLASMA ADDRESSED LIQUID CRYSTAL DISPLAY. The aforementioned applications are hereby incorporated herein by reference.

BACKGROUND OF THE INVENTION

1. Field of the Invention

The invention pertains to the field of reflective displays and methods of manufacture. More particularly, the invention pertains to electrophoretic displays containing barrier walls and barrier electrodes, and fabricating such displays using fibers and/or hollow tubes.

2. Description of the Related Art

There are several different methods of producing a reflective display, however when fabricating very large, energy efficient flat panel displays the most promising method uses an electrophoretic switching material. Early work such as that described in U.S. Pat. No. 3,767,392, "Electrophoretic Light Image Reproduction Process", used a suspension of small charged particles in a liquid solution (electrophoretic suspension) for displaying a light image. The suspension is sandwiched between two glass plates with electrodes on the glass plates. If the particles have the same density as the liquid solution then they will not be effected by gravity, therefore the only way to move the particles is by using an electric field. By applying a potential to the electrodes, the charged particles are forced to move in the suspension to one of the contacts. The opposite charge moves the particles to the other contact. Once the particles are moved to one of the contacts, they reside at that point until they are moved by another electric field, therefore the particles are bistable. The electrophoretic suspension is designed such that the particles are a different color than the liquid solution. Therefore, moving the particles from one surface to the other will change the color of the display.

It is very difficult to address most electrophoretic displays. Since electrophoretic materials do not have a voltage threshold, displays fabricated with the electrophoretic materials have to be individually addressed at each pixel. One method to combat this problem is to use active devices that have a voltage threshold. There are two different types of active devices. One type is a transistor array similar to that used in an active matrix liquid crystal display. The second type is a plasma similar to that disclosed in U.S. patent application Ser. No. 09/517,759, entitled REFLECTIVE ELECTRO-OPTIC FIBER-BASED DISPLAYS, hereby incorporated herein by reference.

Active devices are complicated and expensive to fabricate and are usually limited in size. Therefore, an addressing scheme where the display can be passively addressed is desired. One such addressing scheme was introduced by Philips in U.S. Pat. No. 4,203,106 where they added a third control electrode to create a voltage threshold to manage the migration of particles. This third electrode is patterned with holes and is placed over and orthogonal to the attraction electrode. Controlling the voltage on the control electrode causes the particles to migrate into the holes in the control electrode, in turn, changing the color of the display.

Another passively addressed display was invented at Copytele, U.S. Pat. No. 5,345,251. This display is constructed using interleaved electrodes and an orthogonal electrode. The movement of the particles is in the plane between the interleaved electrode and is controlled by the orthogonal electrode. The addressing electrode controls the movement of the particles in all of these passively addressed displays. Since the particles do not have a voltage threshold, it makes it very difficult to matrix address the display. In order to achieve passive matrix addressing, a barrier must be added to the cell between the two driving electrodes.

A display which uses a barrier between drive electrodes was disclosed by E. Kishi, et al., "Development of In-Plane EPD", SID 00 Digest, pp. 24–27. Two types of barriers were disclosed: a physical barrier 48, shown in FIG. 1, and an electrical barrier 44, shown in FIG. 2. Both displays are constructed by building up the structure on a top 30B and a bottom 30T substrate. A separator 45 is used to create the cell that houses the electrophoretic material 37. The drive electrodes 43 and 42 are electrically isolated from the cell and each other using dielectric layers 46 and 47. The operation of these displays is achieved by placing voltages on both driving electrodes 43 and 42 and controlling the flow of particles over the barriers using the control electrode 41.

Assuming the particles 37 are positively charged, then the display is in a holding state when a large positive voltage is applied to the control electrode 41, a small positive voltage is applied to the $1^{st}$ driving electrode 43, and a negative voltage is applied to the $2^{nd}$ driving electrode 42. In the case where the barrier is created by an electric field (FIG. 2), a positive voltage is applied to the barrier electrode 44. To move the particles 37 from the $1^{st}$ driving electrode 43 to the $2^{nd}$ driving electrode 42, the positive voltage on the control electrode 41 is reduced. In this case, the particles 37, which are repelled from the $1^{st}$ driving electrode 43, are allowed to flow over the barrier to the $2^{nd}$ driving electrode 42.

This passive method of addressing by adding barriers helps in addressing the pixel, but has problems addressing more than one row in a display. In addition, the display will have a high manufacturing cost because of the multiple steps needed to create the structure and pattern the electrodes in the display. The display will also be limited in size since the structure is built-up on a substrate. The following invention solves the manufacturing and addressing issues and is cost effective in a large panel display.

SUMMARY OF THE INVENTION

The invention includes the use of hollow tubes filled with an electrophoretic material sandwiched between two plates to form a reflective display. The hollow tubes have either barrier walls or an electrostatic barrier, which restricts the flow of electrophoretic particles within the hollow tubes. The flow of electrophoretic particles over these barriers is controlled using electric fields, which makes it possible to matrix address the electrophoretic displays. Wire electrodes built into the hollow tubes and electrodes on the two plates are used to create the electric field and address the display. The electrodes on the plates can be replaced with wire electrodes or wire electrodes contained within a fiber. The plates are preferably composed of glass, glass-ceramic, polymer/plastic or metal, while the hollow tubes are preferably composed of glass, polymer/plastic or a combination of glass and polymer/plastic. In addition, color is optionally imparted into the display using colored tubes, adding a color coating to the surface of the tubes, or adding the color to the electrophoretic material. Reflectivity within the display is accomplished by using a reflective material to fabricate the tubes, coating the tubes with a reflective material or coating one of the two plates with a reflective material. The display can also function in a transmissive mode by applying an illuminating back to the display.

DETAILED DESCRIPTION OF THE INVENTION

The invention includes the use of fibers mainly in the form of hollow tubes with wire electrodes and barriers to construct reflective fiber-based displays. Modulating an electro-optic material within the display forms the reflectivity. The wire electrodes are contained within the fiber or on the surface of the fiber. The barriers are either structural barrier walls or created by an electric field from a wire electrode and assist in matrix addressing the display. The fibers or tubes are optionally colored to impart color to the display and can also be partially black to serve a black matrix function which enhances the contrast and sharpness of the display. Alternatively, the fibers or tubes can be white to enhance the reflectivity of the display. The electrophoretic material may also be colored to add color to the display. The fibers or tubes are preferably composed of glass, glass ceramic, plastic/polymer, metal, or a combination of the above.

Figure 1:
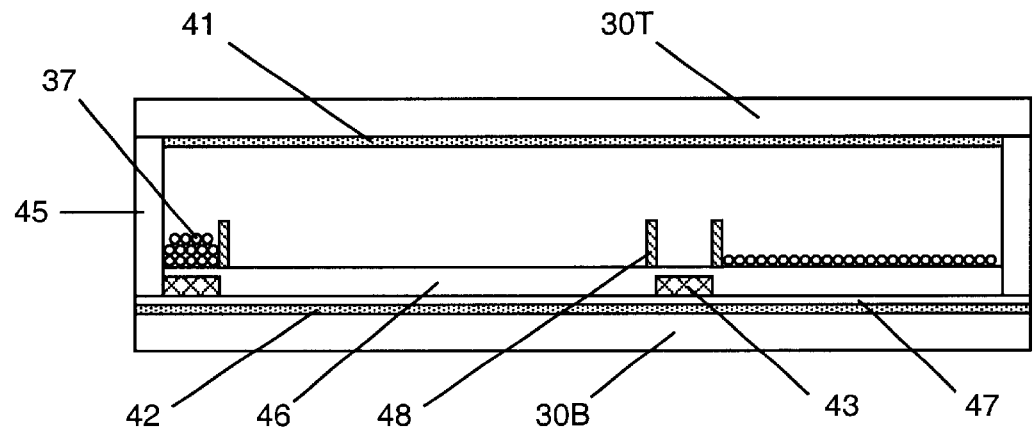
FIG. 1 schematically shows a structural barrier type in plane switching electrophoretic display, in accordance with the prior art.
Figure 2:
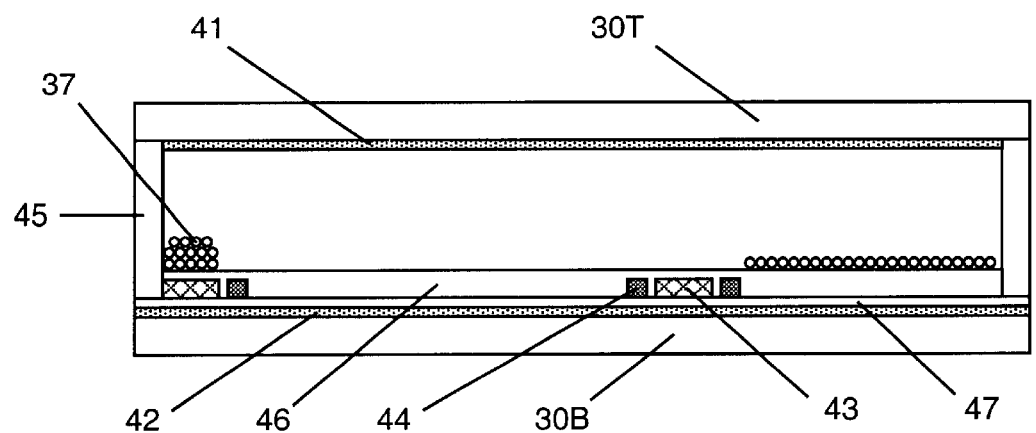
FIG. 2 schematically shows an electrical barrier type in plane switching electrophoretic display, in accordance with the prior art.
Figure 3:
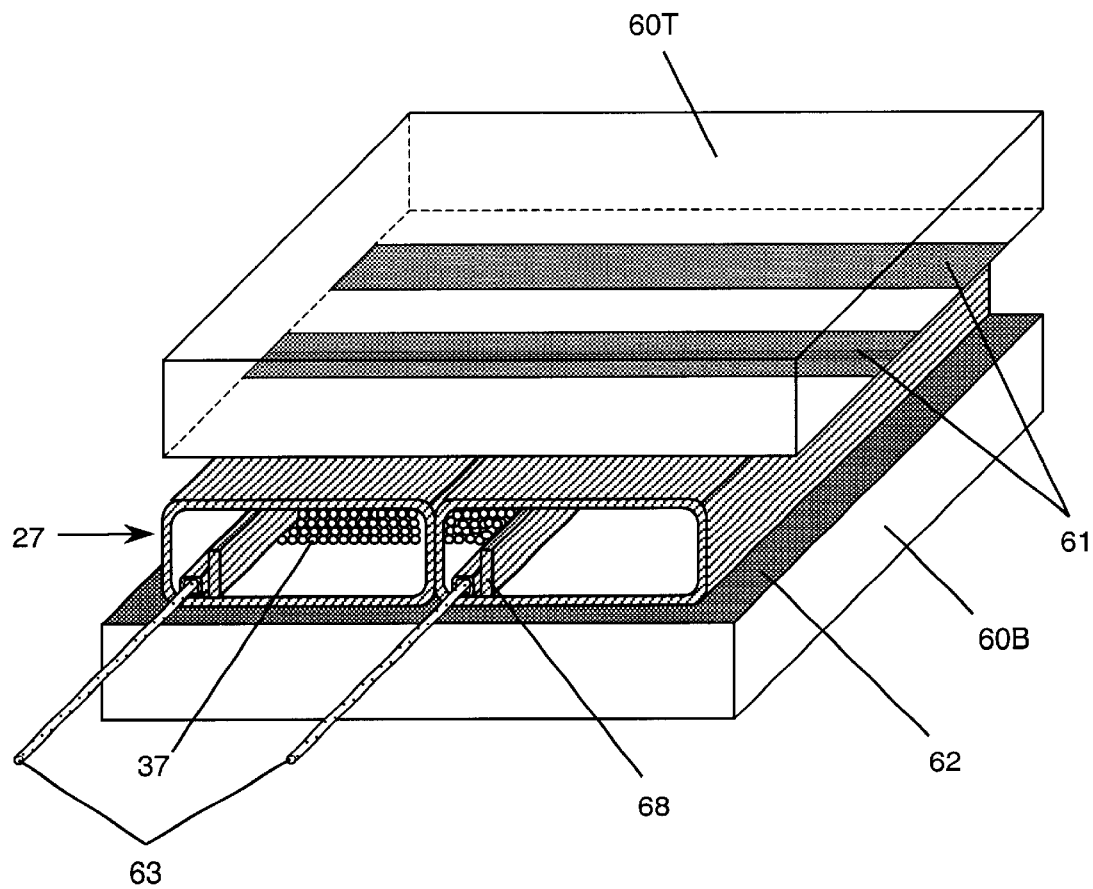
FIG. 3 schematically shows a structural barrier type in plane switching electrophoretic display using hollow tubes containing barrier walls and wire drive electrodes.

FIG. 3 shows a schematic of a structural barrier type in plane switching electrophoretic display using hollow tubes 27 containing barrier walls 68 and wire drive electrodes 63. The height of the physical barrier wall 68 extends less than 100% of the height of the inside of the hollow tube 27, leaving a gap between the barrier wall 68 and the top of the hollow tube 27. The array of tubes 27 are sandwiched between two plates 60T and 60B. The top plate 60T has parallel address electrodes 61 to modulate the flow of electrophoretic particles 37 in the hollow tubes 27. The bottom plate 60B is blanket coated with a second planar drive electrode 62, which is used to attract the particles to the bottom of the hollow tubes 27. Addressing the display is accomplished by applying voltages on the wire drive electrodes 63 and the address electrodes 61 to create an electric field to force the electrophoretic particles 37 to flow over the barrier walls 68, if the pixel is to be dark (a written state).

Figure 4:
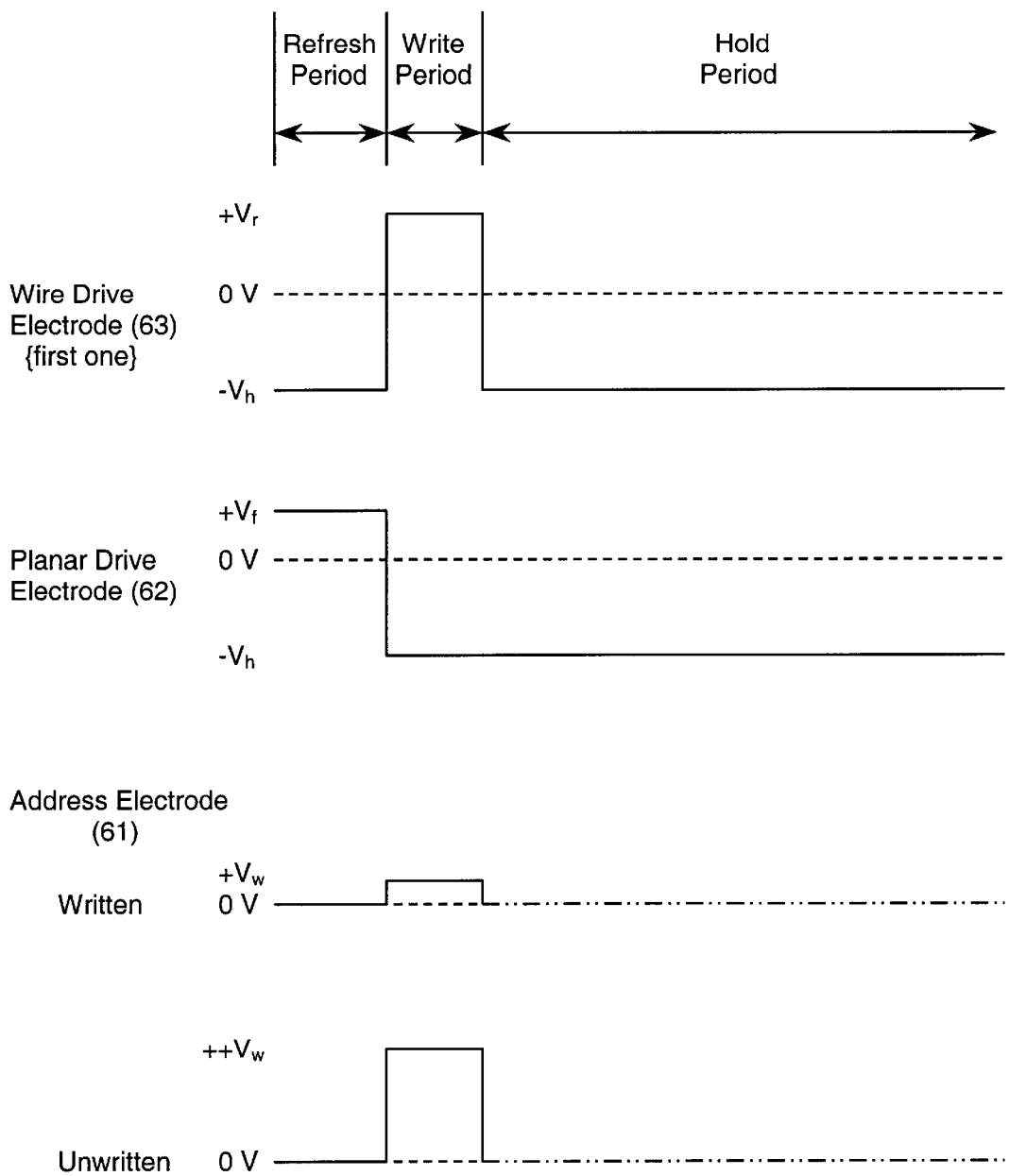
FIG. 4 illustrates voltage waveforms to address a pixel in the display shown in FIG. 3.
Figure 5A:
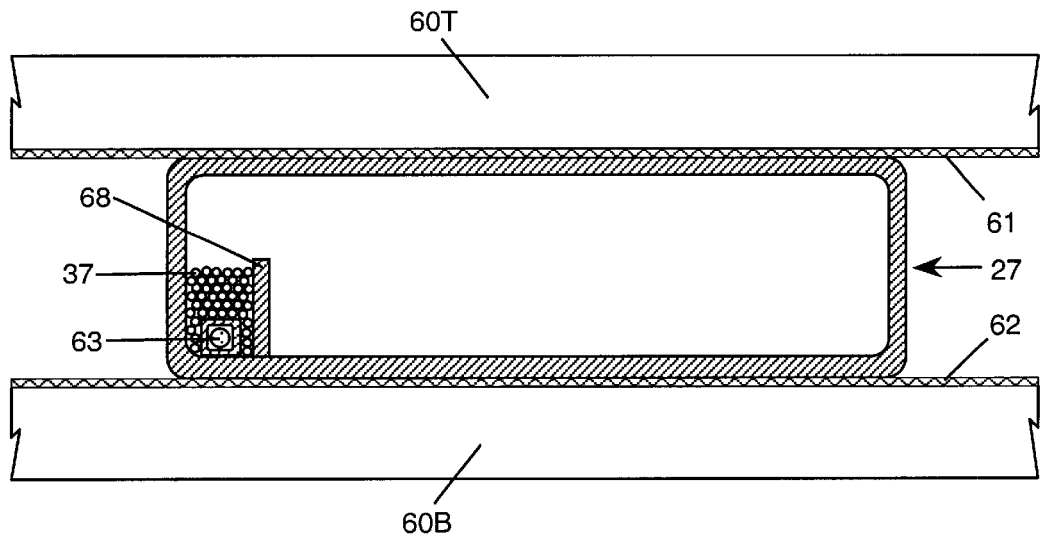
FIG. 5A schematically shows a cross-sectional view of a single pixel of the in plane switching electrophoretic display using hollow tubes containing barrier walls and wire drive electrodes in the unwritten hold state.
Figure 5B:
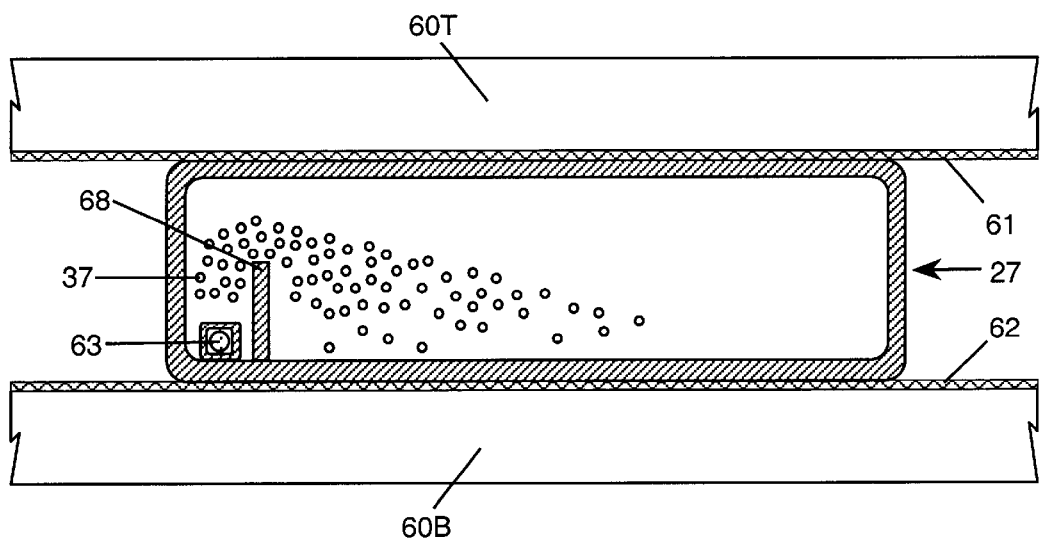
FIG. 5B schematically shows a cross-sectional view of a single pixel of the in plane switching electrophoretic display using hollow tubes containing barrier walls and wire drive electrodes during a writing state.
Figure 5C:
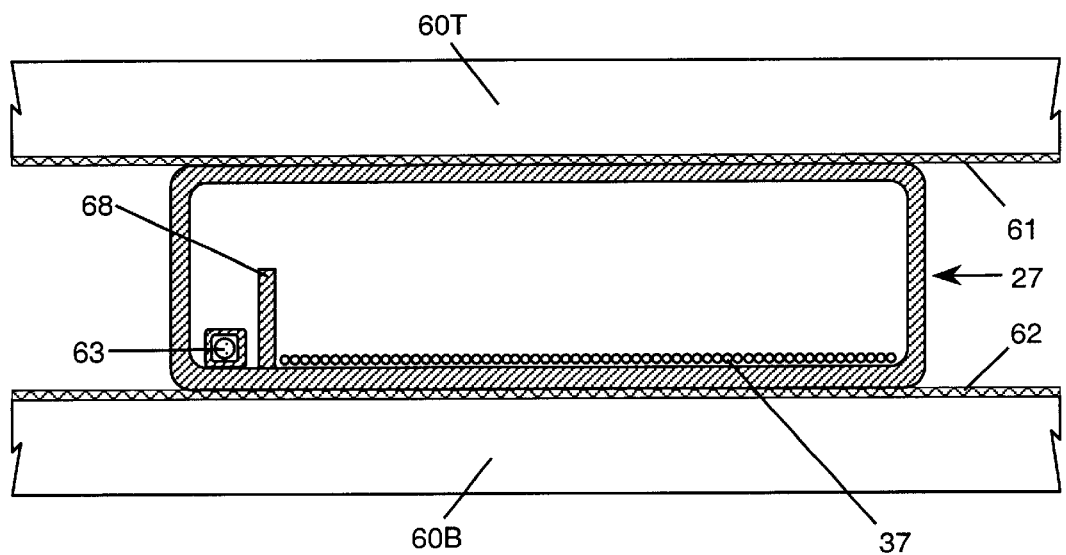
FIG. 5C schematically shows a cross-sectional view of a single pixel of the in plane switching electrophoretic display using hollow tubes containing barrier walls and wire drive electrodes in the written hold state.

FIG. 4 shows typical voltage waveforms to address a pixel in the display. The three periods of addressing, the refresh period, the write period and the hold period, are pictorially represented in FIGS. 5A, 5B, and 5C, respectively. The voltage pulses and representative figures assume that the electrophoretic particles are positively charged. During the refresh period a negative holding voltage, $-V_h$, is applied to the wire drive electrode 63 to attract the particles 37 and a positive refresh voltage, $+V_p$, is applied to the planar drive electrode 62 to repel the particles 37. Under these voltage conditions, the particles 37 collect around the wire drive electrode 63, as shown in FIG. 5A. To place the pixel in a written state, particles must flow over the barrier wall and be collected on the surface of the hollow tube. This flow of particles is accomplished by applying a positive repulsive voltage, $+V_r$, to the wire drive electrode 63 to repel the particles 37 from the wire drive electrode 63. A second positive write voltage, $+V_w$, is applied to the orthogonal address electrode(s) 61 to control the flow of particles 37 over the barrier wall 68, as shown in FIG. 5B. The magnitude of the write voltage, $+V_w$, determines if the particles 37 flow over the barrier wall 68 or not. If a large write voltage, $++V_w$, is applied to the address electrode 61, then the particles 37 are forced to stay below the barrier wall 68 and the cell is in an unwritten state. Whereas, if a small write voltage, $+V_w$, is applied, then the positive voltage from the wire drive electrode 63, $+V_r$, creates a large enough repulsive field to force the particles 37 to flow over the barrier wall 68. A negative voltage, $-V_h$, is also applied to the planar drive electrode 62 to attract the particles 37 that flow over the barrier wall 68 to the bottom of the hollow tube(s) 27, as shown in FIG. 5C. Once the cell has been written (or not), the voltage on the wire drive electrode 63 is reduced to a negative holding voltage, $-V_h$, to attract any remaining particles 37 that have not made it over the barrier wall 68 and allow the next hollow tube 27 row of the display to be addressed. The address voltages, $+V_w$, are then modulated to address the subsequent rows (hollow tubes) in the displays. Note that the planar drive electrode 62 stays at a negative hold voltage, $-V_h$, until the remainder of the display is written and the display is ready to be refreshed.

Gray scale images are optionally created in the display by controlling the write voltage, $+V_w$, on the address electrode 61. Controlling the magnitude of this voltage controls the strength of the repulsive electric field, hence controlling the amount of particles 37 that flow over the barrier wall(s) 68. Reducing the magnitude of the write voltage, $+V_w$, on the address electrode 61 in turn leads to an increased number of particles that surmount the barrier wall(s) 68.

Another method of creating a gray scale image divides the addressing time into sections or bits, similar to the addressing scheme of a plasma display. The amount of time that the write voltage, $+V_w$, on the address electrode 61 is reduced to near zero voltage during the addressing period of a single frame determines the amount of particles 37 that flow over the barrier wall(s) 68. In a preferred embodiment, this time modulating addressing scheme is combined with a JPEG image and the image on the display is written similar to the flow of information from a JPEG image (i.e. the image is written in an intensity map sequence). A third method of creating gray scale breaks the address electrode 61 into several electrodes, similar to that shown in FIG. 13D. The multiple address electrodes can have different widths to control the flow of particles from a larger area.

Figure 6:
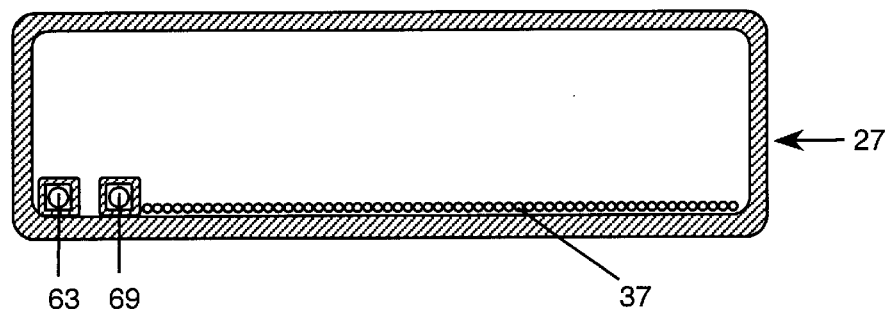
FIG. 6 schematically shows a cross-sectional view of a hollow tube containing a wire drive electrode and a wire barrier electrode.
Figure 7:
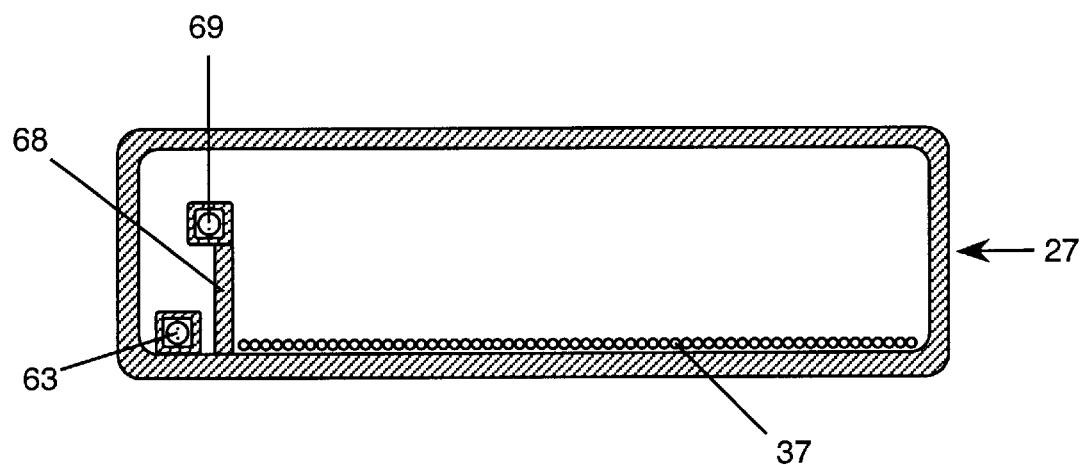
FIG. 7 schematically shows a cross-sectional view of a hollow tube containing a wire drive electrode, a barrier wall and a wire barrier electrode attached to the top of the barrier wall.

The barrier wall 68 in the hollow tube(s) 27 may be replaced with a barrier electrode 69, similar to that shown in FIG. 6. This barrier electrode 69 serves the same purpose as the barrier wall 68 discussed above. The barrier is created by applying a positive voltage to the barrier electrode 69 in turn creating a repulsive barrier for the particles to cross over. The size or height of the barrier is determined by the magnitude of the voltage applied to the barrier electrode 69. The barrier wall 68 and barrier electrode 69 can both be combined into one hollow tube 27 to create a compound barrier, as shown in FIG. 7. This compound barrier yields a much tighter control on the movement of particles 37 across the barrier region. The barrier electrode 69 can be combined with the barrier wall 68 at any location within the barrier wall 68.

Figure 8:
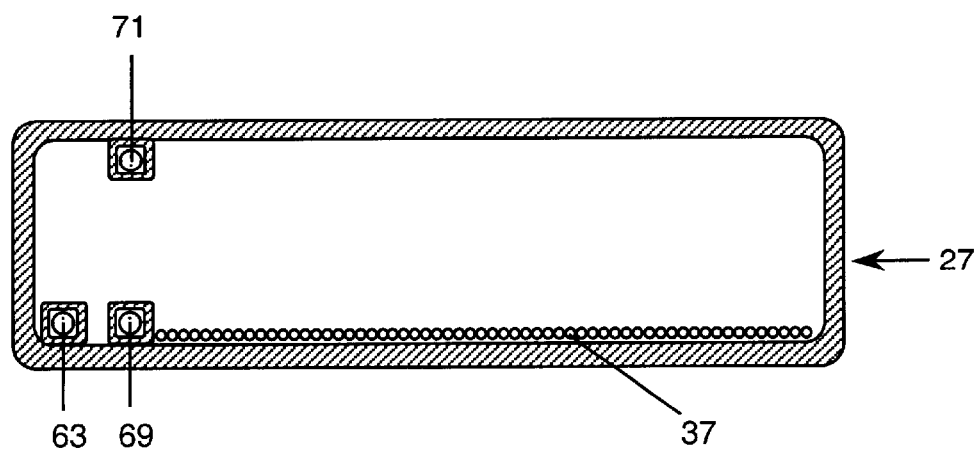
FIG. 8 schematically shows a cross-sectional view of a hollow tube containing a wire drive electrode, a wire barrier electrode and a wire control electrode at the top of the hollow tube directly above the wire barrier electrode.

FIG. 8 shows a cross-section of a hollow tube 27 where the barrier is a gate created by a barrier electrode 69 and a control electrode 71. There are two different methods of operating this type of barrier. The first method creates a gate using the barrier electrode 69 and the control electrode 71. This gate is large enough to keep any particles 37 from passing through it. Then, by applying a negative voltage on the orthogonal address electrode(s) 61 (not shown, see FIG. 3), the gate is locally reduced and particles 37 can pass through it. The other method uses the barrier electrode 69 and control electrode 71 to create a gate weak enough for particles 37 to penetrate through it. Then, by applying a positive voltage on the orthogonal address electrode(s) 61 the gate can be selectively closed to particle 37 flow. The wire drive electrode 63 can be attached to the sides of the hollow tube between the barrier electrode 69 and the control electrode 71 so the particles have a more direct line of sight to the center of the electrostatic gate.

Figure 9A:
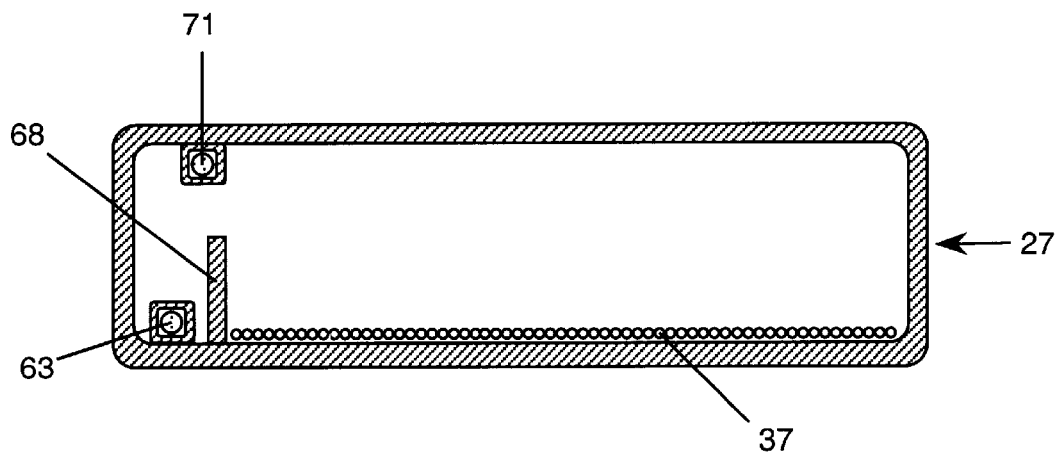
FIG. 9A schematically shows a cross-sectional view of a hollow tube containing a wire drive electrode, a barrier wall and a wire control electrode at the top of the hollow tube directly above the barrier wall.
Figure 9B:
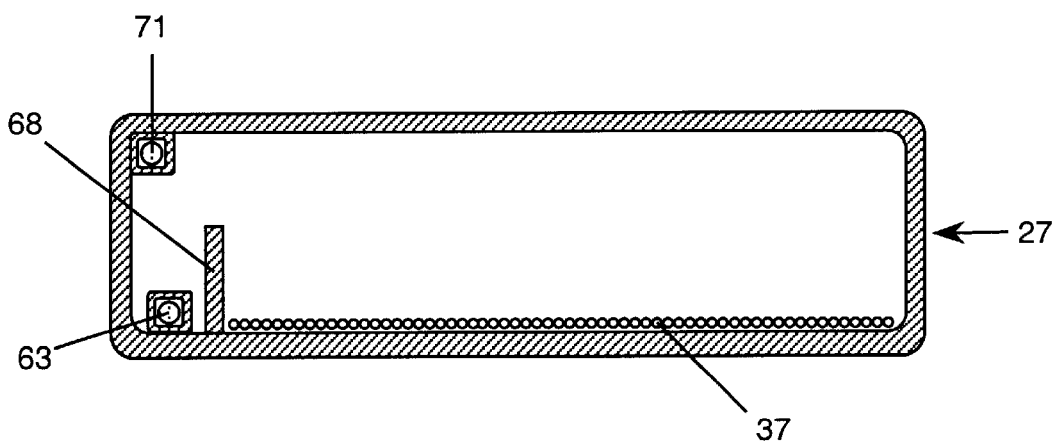
FIG. 9B schematically shows a cross-sectional view of a hollow tube containing a wire drive electrode, a barrier wall and a wire control electrode in the top corner of the hollow tube.

FIG. 9 shows a gate that is created using the barrier wall 68 and a control electrode 71. FIG. 9A shows the control electrode 71 located directly above the barrier wall 68 and FIG. 9B shows the control electrode 71 in the corner of the hollow tube 27. Adding a control electrode 71 allows for many different addressing schemes. But, the largest advantage of adding a control electrode 71 is to even out the particles 37 along the length of the hollow tube 27. During the operation of the display, particles start to aggregate to one location in the hollow tube as the image in that area of the display is continuously written dark. Applying an alternating voltage between the control electrode 71 and the wire drive electrode 63 evenly redistributes the particles. This reconditioning of the distribution of particles is imperative for a display with an even gray scale and color distribution across the display. In addition, the control electrode 71 greatly assists in returning the particles to the wire drive electrode 63. Due to the blocking of the barrier wall, applying a negative voltage to the control electrode 71 pulls the particles 37 from the large volume of the hollow tube 27 much easier than applying the voltage to the wire drive electrode 63.

Figure 10A:
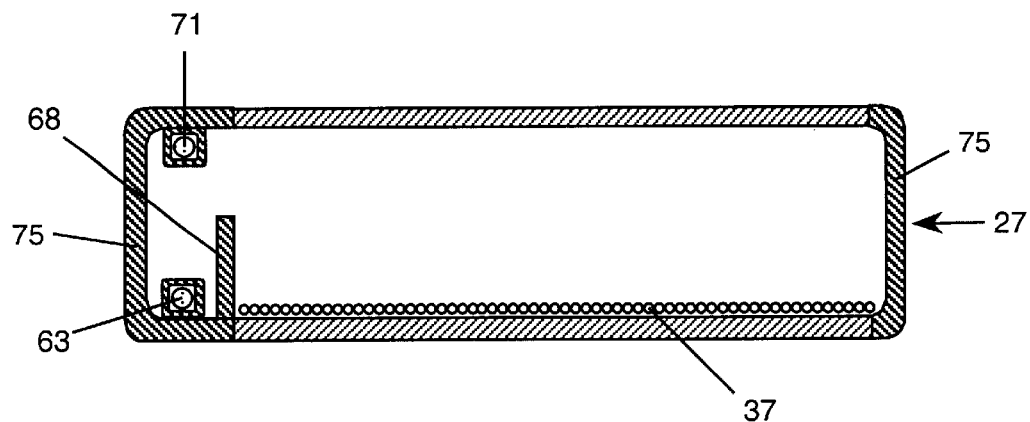
FIG. 10A schematically shows a cross-sectional view of a hollow tube composed of absorbing sidewalls to serve as a black matrix.
Figure 10B:
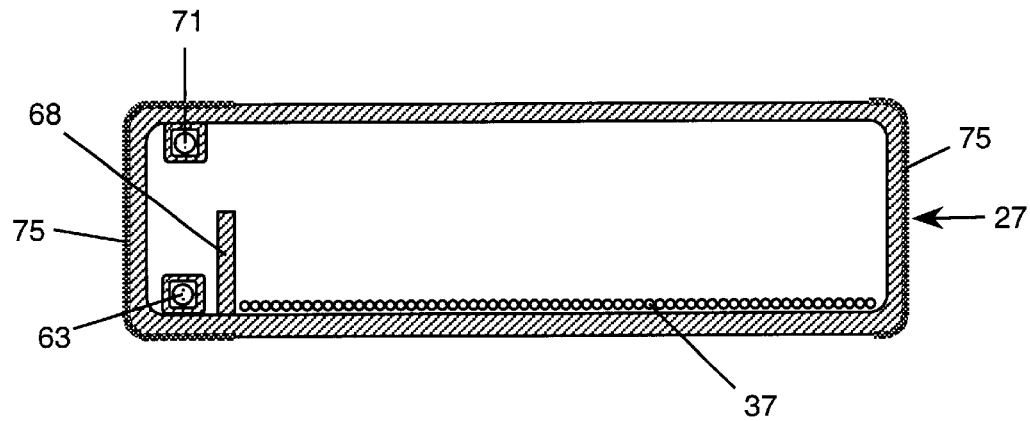
FIG. 10B schematically shows a cross-sectional view of a hollow tube coated with an absorbing film on the sidewalls to serve as a black matrix.
Figure 10C:
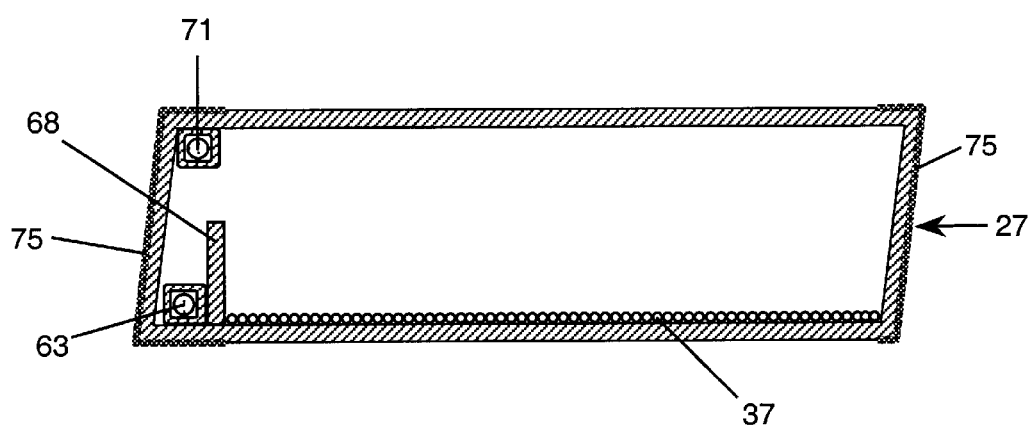
FIG. 10C schematically shows a cross-sectional view of a skewed hollow tube coated with an absorbing film on the side-walls to block all unwanted light through the display.

In order to increase the contrast of the display, light absorbing regions 75 must be added to the sides of the hollow tubes 27, as shown in FIG. 10. These light absorbing regions 75 function as a black matrix and keep light from penetrating through the unmodulated regions of the display. FIG. 10A shows that the black absorbing region 75 is contained within the hollow tube 27. Alternatively, the black absorbing region 75 is coated on the ends of the hollow tube 27, as shown in FIG. 10B. Both FIGS. 10A and 10B block the unwanted light within the hollow tube, but light still can be transmitted between the hollow tubes 27 if they are not in intimate contact. However, by designing the hollow tubes 27 in an interlocking mechanism or simply slanting the side of the hollow tubes 27, similar to that shown in FIG. 10C, the light transmission between the hollow tubes 27 is blocked.

Figure 11A:
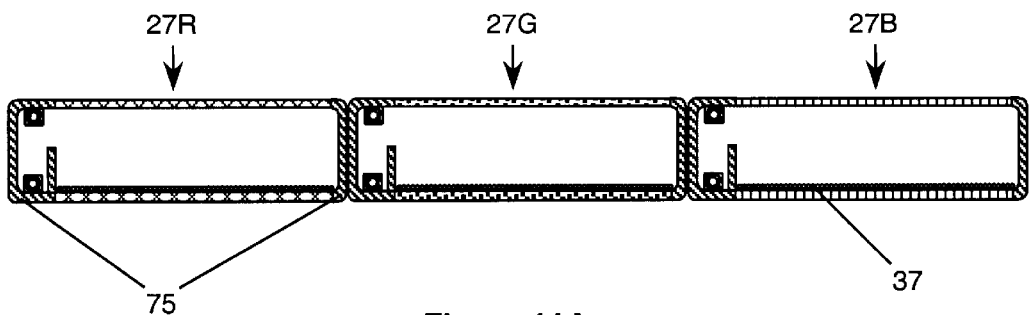
FIG. 11A schematically shows a cross-sectional view of a hollow tube composed of a colored material to add color to the display.

FIG. 11 shows several ways to add color to the display. Color is added to the display by fabricating the hollow tubes (27R, 27G, 27B) from a color material, as shown in FIG. 11A, or by coating the hollow tubes with a colored die. The color die is coated on either the inside or outside of the hollow tubes. The colored die and/or black matrix can be coated on the tubes (27R, 27G, 27B) during the draw process. This can be done using several different methods, the most promising method being spraying or drawing the tubes (27R, 27G, 27B) over or past a coating system.

Figure 11B:
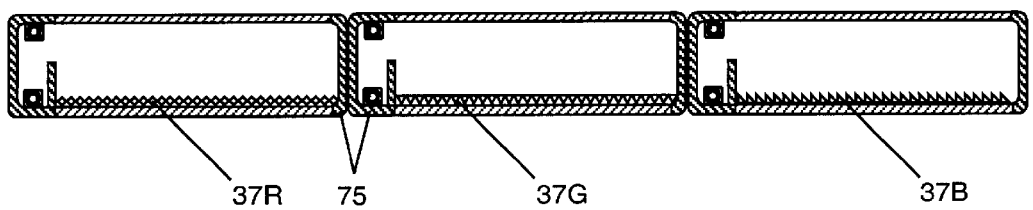
FIG. 11B schematically shows a cross-sectional view of a hollow tube containing colored electrophoretic particles to add color to the display.
Figure 11C:
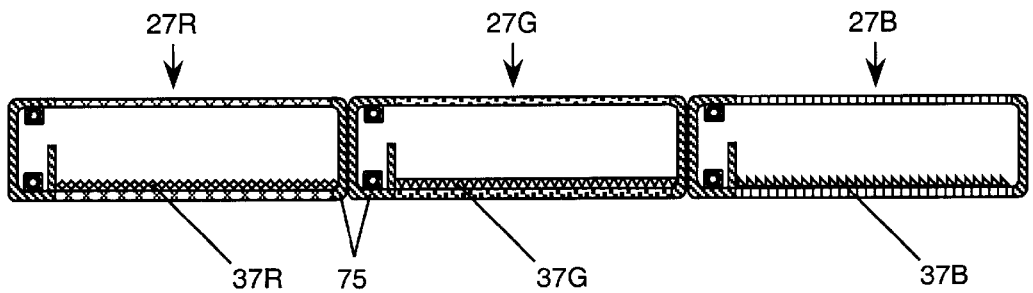
FIG. 11C schematically shows a cross-sectional view of a hollow tube composed of a colored material and containing colored electrophoretic particles to add color to the display.

Coating the tubes (27R, 27G, 27B) with both the black matrix material 75 and color filter material requires two different coating systems. The first system coats the sides with an absorbing black matrix material 75, while the second system coats the top, bottom or both top and bottom with a particular color film (red, green, or blue) to create the color in the display. Color can also be added to the display by either making the particles (37R, 37G, 37B) different colors in the hollow tubes, as shown in FIG. 11B, or by making the liquid medium the particles 37 reside in colored. To achieve the best color quality in the display, both the hollow tubes (27R, 27G, 27B) and electrophoretic particles (37R, 37B, 37G) have to be colored, as shown in FIG. 11C.

Figure 12A:
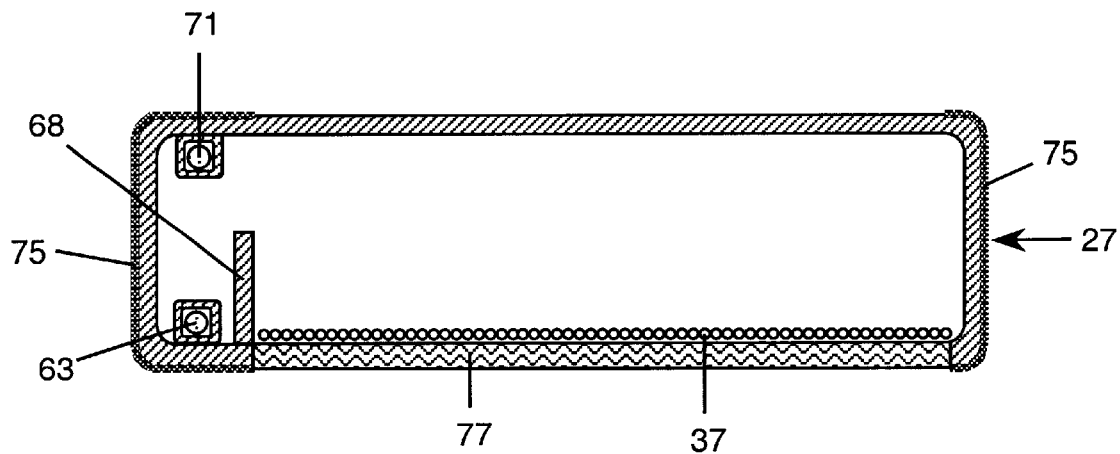
FIG. 12A schematically shows a cross-sectional view of a hollow tube composed of a reflective material to add reflectivity to the display.
Figure 12B:
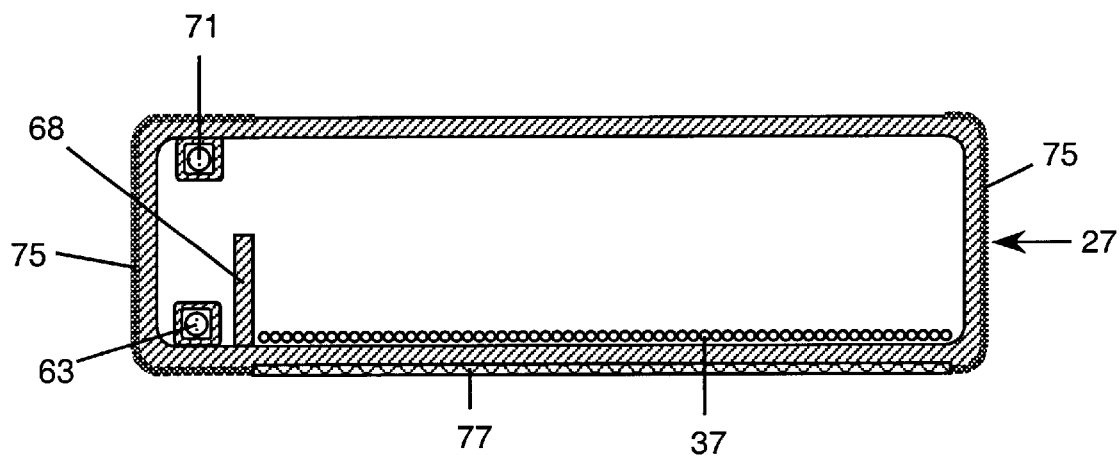
FIG. 12B schematically shows a cross-sectional view of a hollow tube coated with a reflective material to add reflectivity to the display.

Reflectivity in the display is achieved by using a reflective conductive planar drive electrode 62, shown in FIG. 3. Using a highly reflective metal film for this electrode 62 yields a high reflectivity, however the display only functions in a reflective mode. To fabricate a transflective display that can be operated in both a reflective and transmissive mode, the reflecting material must be both transmissive and reflective. An example of one such material is a conductive coating that is used in a one-way mirror, where the mirror side faces the viewer. Therefore, when there is a high level of incident light on the display, it functions in a reflective mode, but when the background illumination level is low, the display is back illuminated and functions in a transmissive mode. The reflectivity of the display can also be included in the hollow tubes 27, as shown in FIG. 12. FIG. 12A shows the reflective layer 77 as part of the hollow tube 27. If the hollow tube 27 is composed of glass, this reflective layer 77 is preferably an opal glass. Alternatively, if the hollow tube is composed of plastic, then white pigment or colorant could be added to the polymer blend to form the hollow tube(s) 27. The reflective layer 77 could also be added to the surface of the hollow tube 27, as shown in FIG. 12B. This reflective coating 77 could be a simple white paint and/or could be conductive and serve as the planar drive electrode 62.

In order to create very large displays, it is advantageous to replace the patterned address electrodes 61 on the top plate 60T with wire address electrodes 61W, as shown in FIG. 13. FIG. 13A shows a cross-section of a typical patterned top plate 60T with the transparent address electrodes 61, similar to that shown in FIG. 3. These address electrodes 61 are replaced with an array of wires 61W, as shown in FIG. 13B. One potential problem with using individual wires as the address electrodes 61W is holding the wires on a given pitch or separation. To alleviate this problem, the wires are held in the exact location by adding a transparent flowable film between the top plate 60T and the hollow tubes 27. This flowable film not only holds the wire address electrodes 61W in place but also removes the light reflection at that interface.

Figure 13A:
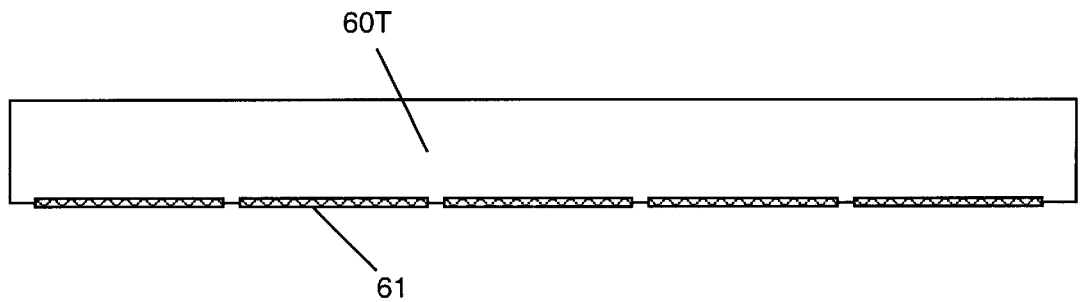
FIG. 13A schematically shows a cross-sectional view of the top plate with transparent address electrodes, shown in FIG. 3.
Figure 13B:
FIG. 13B schematically shows a cross-sectional view of the address electrodes composed of an array of wire electrodes.
Figure 13C:
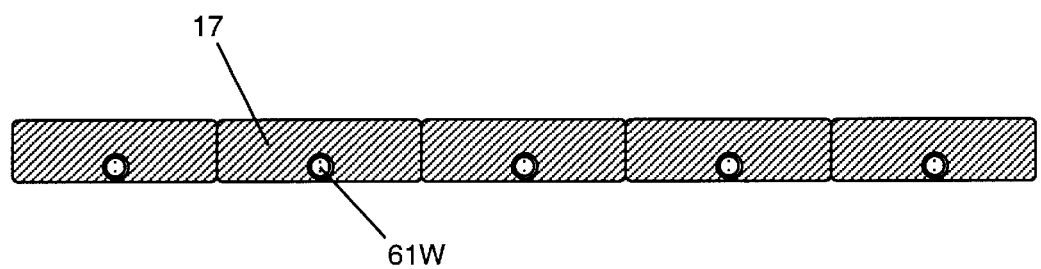
FIG. 13C schematically shows a cross-sectional view of an array of fibers containing one wire address electrode per fiber to replace the top plate.
Figure 13D:
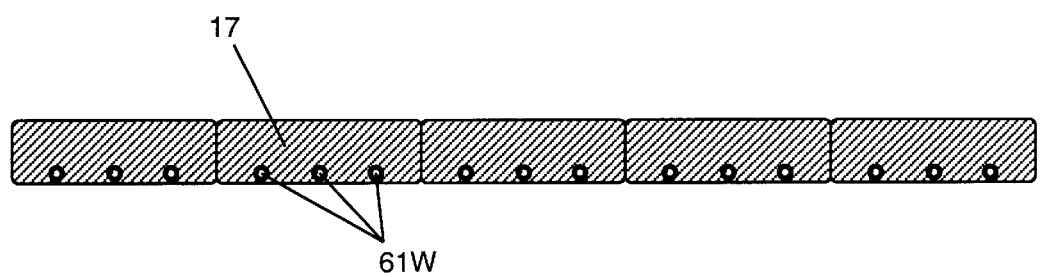
FIG. 13D schematically shows a cross-sectional view of an array of fibers containing three-wire address electrode per fiber to replace the top plate.

Another method to maintain the correct pitch is to include the wire address electrodes 61W in a fiber similar to that shown in FIG. 13C. In this case, arraying the fibers 17 into a compact sheet places the wire address electrodes 61W on a specified pitch. Since the wire is made as thin as possible to allow for the maximum amount of light to be transmitted through the display, the electric field created by the wire is narrow. One potential solution to this problem is to add more than one wire address electrode 61W per fiber 17, as shown in FIG. 13D. Multiple wire electrodes 61W spread out the electric field and the thin or small diameter of the wire minimizes the obstruction of light passing through the display.

Another potential problem with fabricating a high quality reflective display is the reflection at the interfaces between the plates 60 and the hollow tubes 27 or fibers 17. These additional surfaces create reflections, which lowers the contrast ratio of the display. To reduce or eliminate these reflections, a flowable polymer material is optionally included into the structure between the plates 60 and the hollow tubes 27 or fibers 17. A polymer material, such as, for example, ethylvinyl acetate (EVA), is optionally used to remove these reflections. In addition, it is advantageous to match the index of refraction of the plates, fibers/tubes, and electrophoretic solution to reduce reflections.

Figure 14A:
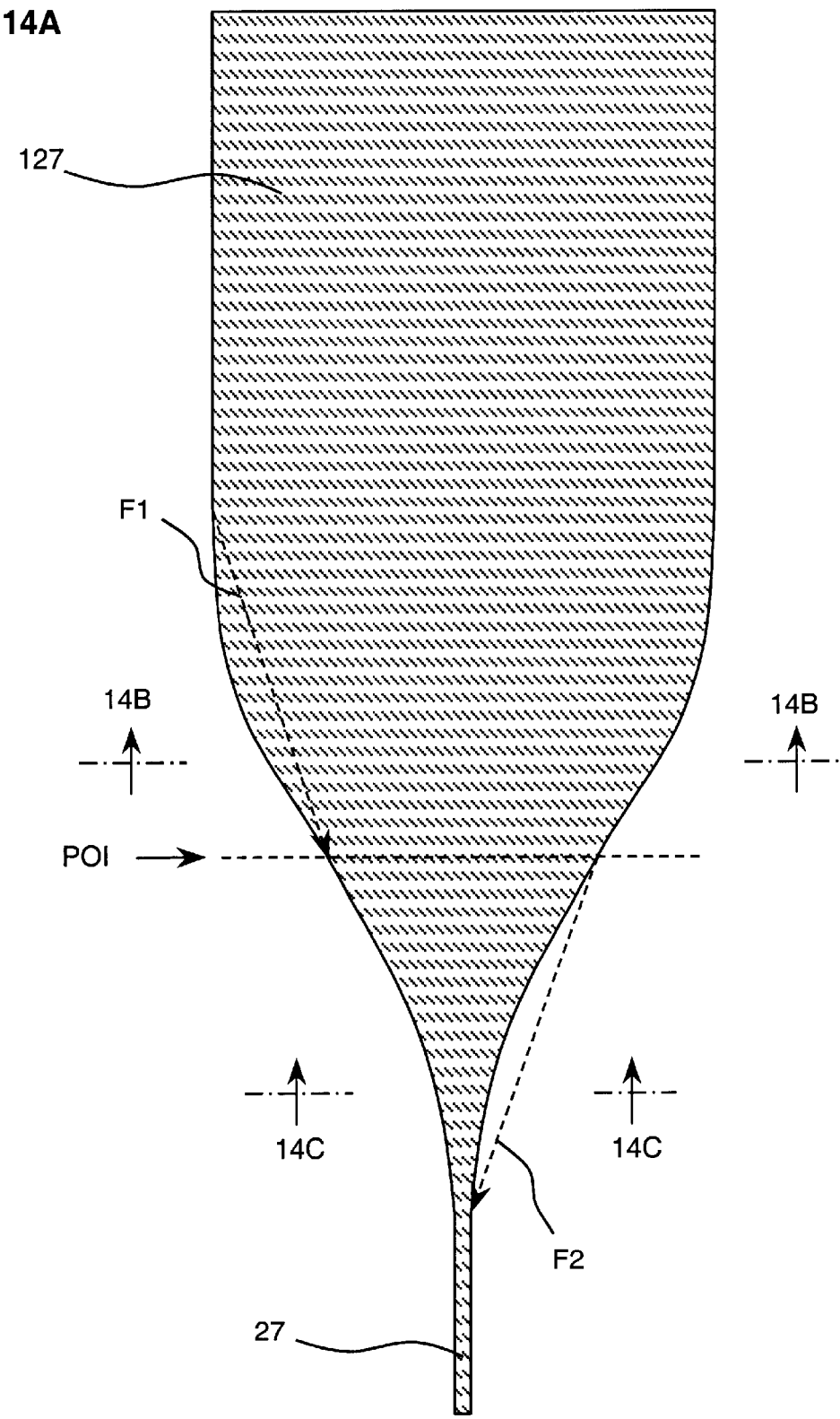
FIG. 14A illustrates the change in cross-sectional shape of the preform/fiber in the root during the draw process.
Figure 14B:
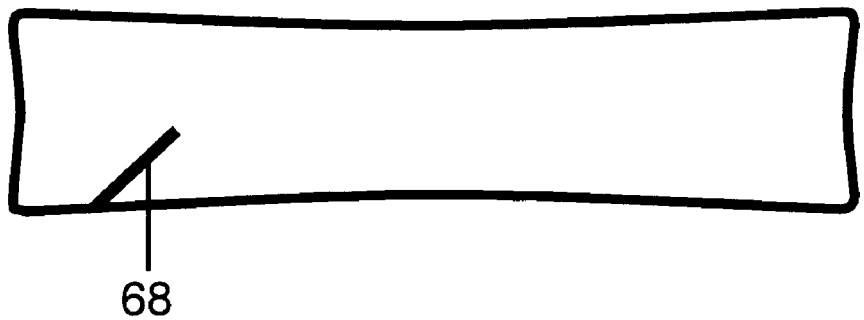
FIG. 14B schematically shows a cross-sectional view of the top of the root shown in FIG. 14A.
Figure 14C:
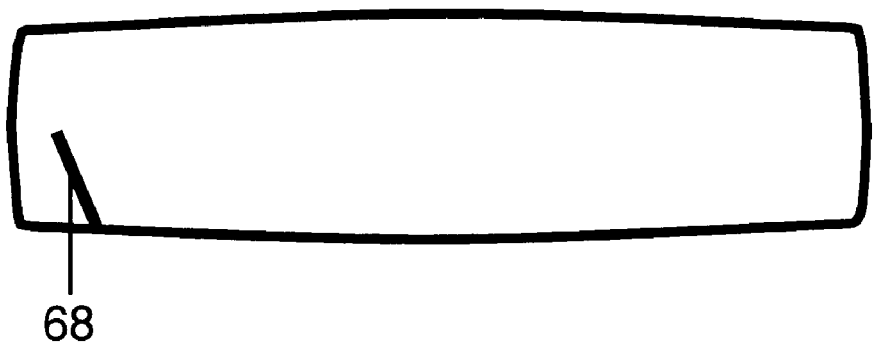
FIG. 14C schematically shows a cross-sectional view of the bottom of the root shown in FIG. 14A.

To fabricate the hollow tubes 27 and fibers 17, larger size preforms 127 are drawn into smaller sizes 27, as shown in FIG. 14A. The art of including the wire electrodes and forming the arrays of hollow tubes 27 or fibers 17 is explained in copending U.S. application Ser. No. 09/299, 350, filed Apr. 26, 1999, entitled "PROCESS FOR MAKING ARRAY OF FIBERS USED IN FIBER-BASED PLASMA", which is hereby incorporated herein by reference. During the "fiber draw" process, the shape of the hollow tubes and barrier wall 68 is altered. This shape change is a result of forces exerted on the tube and wall in reducing the size from a preform 127 to a hollow tube 27. The section of the "fiber draw" where the "fiber" is reduced in size is called the root of the draw. In the root of the draw, there are two normal forces that act on the "fiber". At the top of the root the force (F1) acts to pull all points to the centerline of the preform/fiber. This force (F1) is present until the root goes through the point of inflection (POI), the point at which the curvature of the root goes from concave outward to concave inward. The resulting change in shape of the hollow tube and barrier wall 68 is shown in FIG. 14B, a cross-sectional view of FIG. 14A. Note that the force (F1) pulls the top of the barrier wall 68 and the sides of the hollow tube to the centerline of the cross-sectional shape. After the point of inflection, a force (F2) tends to "push" all parts of the preform/fiber away from the centerline. This force (F2) creates a final hollow tube and barrier wall 68 shape as shown in FIG. 14C, a cross-sectional view of FIG. 14A. Note that the force (F2) pushes the top of the barrier wall 68 and the sides of the hollow tube outward from the centerline of the cross-sectional shape.

Figure 15A:
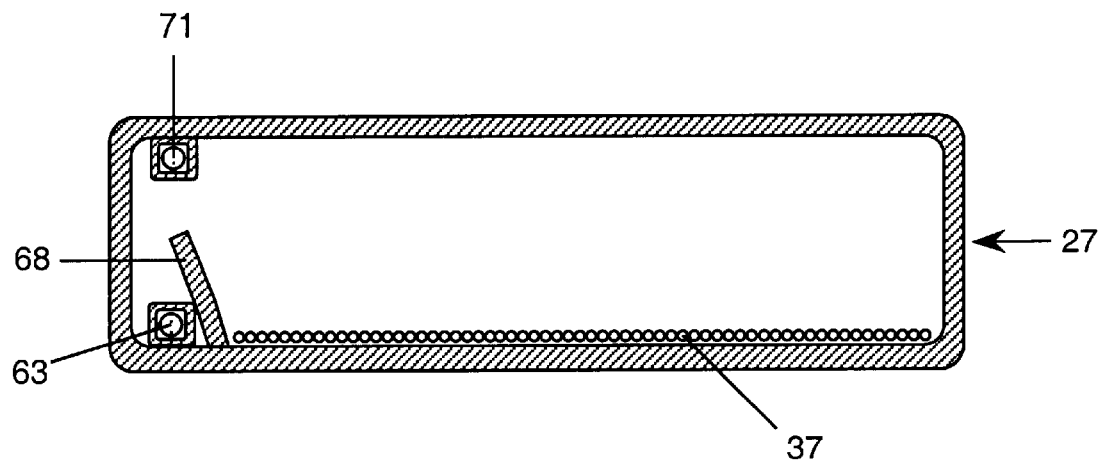
FIG. 15A illustrates how the angle of the barrier wall changes after the draw process.
Figure 15B:
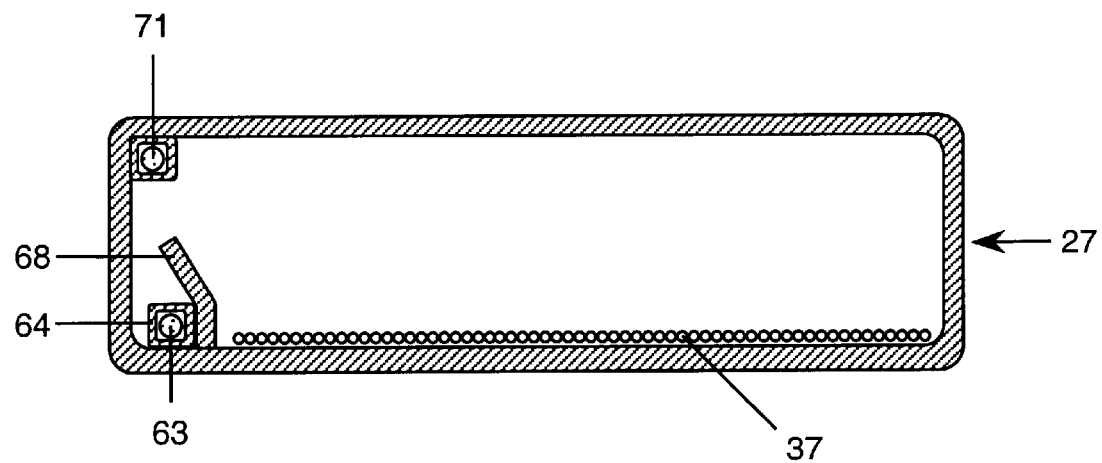
FIG. 15B illustrates how the angle of the barrier wall changes after the draw process if it is positioned against the drive electrode.

By applying a small negative pressure or vacuum in the centerline of the hollow tube preform 127 during the draw process, the hollow tube 27 is kept from bowing outward, however the barrier wall 68 is still tilted outward, similar to that shown in FIG. 15A. Tilting of the barrier wall 68 during the draw process is advantageous in that it creates a better barrier for the electrophoretic particle 37 flow. Connecting the barrier wall 68 to the small square tube 64, housing the wire drive electrode 63, causes the barrier wall 68 to be bent over top of the wire drive electrode 63 during the draw process, as shown in FIG. 15B.

Figure 16:
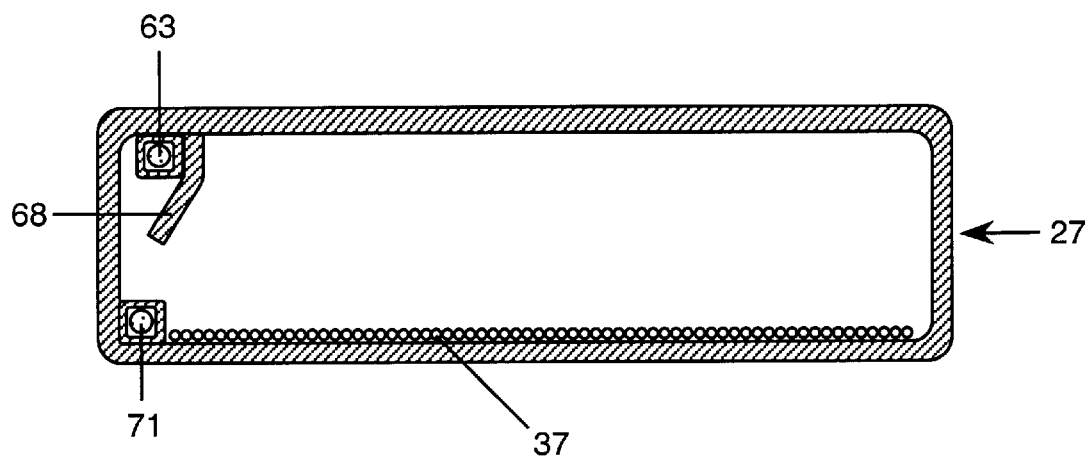
FIG. 16 schematically shows a cross-sectional view of a hollow tube with the wire drive electrode and barrier wall in the top corner of the hollow tube.

FIG. 16 represents a method of placing the wire drive electrode 63 and barrier wall 68 in the top corner of the hollow tube 27 and the control electrode 71 in the bottom corner of the hollow tube 27. Addressing this type of display could be similar to that discussed above or the top plate 60T with address electrodes 61 (shown in FIG. 3) could be placed below the hollow tubes 27 to replace the bottom plate 60B and planar drive electrode 62. The lines in the display are addressed along the length of the hollow tubes 27 by applying a voltage on the address electrode 61 and modulating the particle flow using the control electrode 71. In addition, the barrier wall 68 is optionally replaced with a barrier electrode, similar to that shown in FIG. 8.

Figure 17:
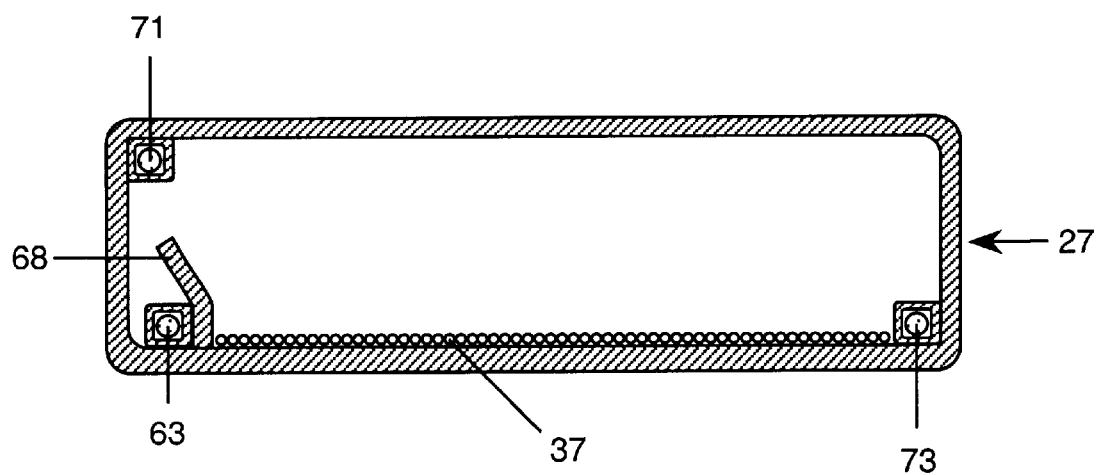
FIG. 17 schematically shows a cross-sectional view of a hollow tube with an additional wire drive electrode.

FIG. 17 shows the addition of a second wire drive electrode 73. Adding a second wire drive electrode 73 to the structure of the hollow tube 27 eliminates the need for the planar drive electrode 62 (shown in FIG. 3). Using a second wire drive electrode 73 enhances the addressability of each row of hollow tubes 27 in the display by locally controlling the voltage in each hollow tube 27. Unfortunately, using a second wire drive electrode 73 instead of a planar drive electrode 62 localizes the field and tends to attract the electrophoretic particles 37 toward the second wire drive electrode 62.

Figure 18:
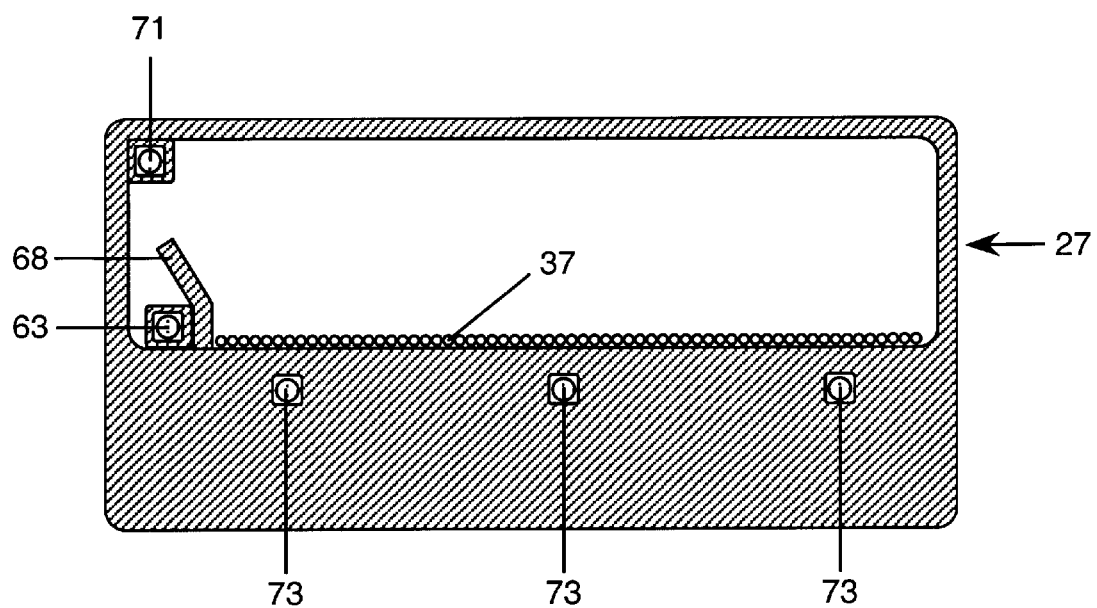
FIG. 18 schematically shows a cross-sectional view of a hollow tube with three wire drive electrodes in the bottom section of the tube.

One method to spread out the electrophoretic particles once the cell has been written is to apply a high frequency AC voltage between the two wire drive electrodes 63 and 73. If this high frequency AC voltage is faster than the time it takes the electrophoretic particles 37 to traverse the hollow tubes 27 then it acts as an electronic shaker to spread out the particles. Another method which uses a second wire drive electrode 73 included in the structure of the hollow tubes 27 is to use multiple second wire drive electrodes 73, as shown in FIG. 18. Placing multiple second wire drive electrodes 73 below the center of the hollow tube 27 spreads out the electric field and creates a more uniform attraction potential for the electrophoretic particles 37.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electronic display comprising:
    a) at least one hollow tube to form structure within said electronic display;
    b) an electrophoretic material contained within said hollow tube, wherein said electrophoretic material can be electrically addressed;
    c) at least one drive electrode to address said electrophoretic material; and
    d) a barrier which resides within said hollow tube such that said barrier restricts the flow of said electrophoretic material.

2. The electronic display of claim 1, wherein said drive electrode is composed of a wire and is located within said hollow tube.

3. The electronic display of claim 1, wherein said drive electrode is located on a surface of said hollow tube.

4. The electronic display of claim 1, wherein the barrier comprises a physical wall within said hollow tube.

5. The electronic display of claim 4, further comprising a barrier electrode within said barrier wall.

6. The electronic display of claim 4, further comprising a barrier electrode on the surface of said barrier wall.

7. The electronic display of claim 1, wherein the barrier comprises an electrode that creates an electric field within said hollow tube to restrict the flow of said electrophoretic material.

8. The electronic display of claim 1, wherein the barrier comprises a gate, wherein said gate is formed from opposing electric fields created by a material selected from the group consisting of:
    a) a barrier electrode and a control electrode; and
    b) a barrier wall and a control electrode.

9. The electronic display of claim 1, wherein said display functions in a reflective mode.

10. The electronic display of claim 1, wherein said display functions in a transmissive mode.

11. The electronic display of claim 1, wherein said display functions in both a reflective and transmissive mode.

12. The electronic display of claim 1, wherein said hollow tube is sandwiched between two plates to form said electronic display.

13. The electronic display of claim 12, wherein at least one of said plates is coated with a conductive film.

14. The electronic display of claim 13, wherein said conductive film is reflective.

15. The electronic display of claim 12, wherein a polymer material is placed between said hollow tube and at least one of said plates to reduce a reflection at an interface between the hollow tube and the plate.

16. The electronic display of claim 12, wherein said plates are composed of a material selected from the group consisting of:
    a) glass;
    b) glass-ceramic;
    c) polymer/plastic;
    d) metal; and
    e) a combination of at least two of the above.

17. The electronic display of claim 1, wherein said hollow tube is curved to fabricate a curved electronic display.

18. The electronic display of claim 1, wherein said hollow tube is composed of a material selected from the group consisting of:
    a) glass;
    b) glass-ceramic;
    c) polymer/plastic;
    d) metal; and
    e) a combination of at least two of the above.

19. The electronic display of claim 1, wherein said hollow tube comprises a colored material which adds color to the electronic display.

20. The electronic display of claim 19, wherein said hollow tube is partially composed of said colored material.

21. The electronic display of claim 19, wherein said colored material is coated on at least a portion of a surface of said hollow tube.

22. The electronic display of claim 1, wherein a plurality of particles in said electrophoretic material are colored to add color to the electronic display.

23. The electronic display of claim 1, wherein a colorant is added to the liquid which suspends the particles in said electrophoretic material to add color to the electronic display.

24. The electronic display of claim 1, wherein said hollow tube comprises an absorbing material such that said absorbing material serves as a black matrix.

25. The electronic display of claim 24, wherein said absorbing material is contained within said at least one hollow tube.

26. The electronic display of claim 24, wherein said absorbing material is coated on at least a portion of a surface of said hollow tube.

27. The electronic display of claim 24, wherein said hollow tube comprises an interlocking mechanism such that a light transmission between at least two hollow tubes is blocked.

28. The electronic display of claim 24, wherein said hollow tube comprises a slanted side wall such that a light transmission between at least two hollow tubes is blocked.

29. The electronic display of claim 1, wherein at least a portion of said hollow tube is compose d of a reflective material that assists in the reflectivity of said electronic display.

30. The electronic display of claim 1, wherein a reflective material is coated on at least a portion of said hollow tube to assist in the reflectivity of said electronic display.

31. The electronic display of claim 30, wherein said reflective material is conductive and serves as a planar drive electrode in said electronic display.

32. An electronic display comprising:
   a) at least one hollow tube to form structure within said electronic display;
   b) an electrophoretic material contained within said hollow tube, wherein said electrophoretic material can be electrically addressed;
   c) a barrier contained within said hollow tube such that said barrier restricts the flow of said electrophoretic material;
   d) at least one drive electrode located within or on a surface of said hollow tube to assist in addressing said electrophoretic material;
   e) at least one address electrode arranged orthogonal to said drive electrode to assist in addressing said electrophoretic material; and
   f) two plates sandwiching said hollow tube.

33. The electronic display of claim 32, wherein at least one of said plates sandwiching said hollow tube contains said address electrode.

34. The electronic display of claim 32, wherein said address electrode is composed of a metal wire.

35. The electronic display of claim 34, wherein said address electrode is contained within a fiber composed of a material selected from the group consisting of glass and polymer/plastic.

36. The electronic display of claim 35, further comprising a polymer material placed at a location selected from the group consisting of:
   a) between said hollow tube and at least one of said plates;
   b) between said address electrode and at least one of said plates;
   c) between said fiber and at least one of said plates;
   d) between said hollow tube and said address electrode;
   e) between said hollow tube and said fiber; and
   f) any combination of at least two of the above;
   such that a reflection at an interface is reduced.

37. The electronic display of claim 32, further comprising a polymer material placed at a location selected from the group consisting of:
   a) between said hollow tube and at least one of said plates;
   b) between said address electrode and at least one of said plates;
   c) between said hollow tube and said address electrode; and
   d) any combination of at least two of the above; such that a reflection at an interface is reduced.

38. The electronic display of claim 32, wherein one of said plates is blanket coated with a planar drive electrode.

39. The electronic display of claim 32, wherein said barrier is selected from the group consisting of:
   a) a physical wall extending less than 100% of a height of an inside of the hollow tube; and
   b) an electrostatic barrier created by applying a voltage to a barrier electrode.

40. The electronic display of claim 32, further comprising an address drive control system wherein said address drive control system includes:
   means for moving a plurality of electrophoretic particles to one side of said barrier, thereby placing the entire hollow tube in an unwritten state;
   means for controlling a movement of said electrophoretic particles over said barrier by applying at least one voltage to the address electrodes in said electronic display; and
   means for attracting said electrophoretic particles to a surface inside said hollow tube, thereby placing a section of said hollow tube in a written state.

41. The electronic display of claim 40, further comprising a gray scale created by a method selected from the group consisting of:
   a) controlling a magnitude of a voltage which controls said movement of electrophoretic particles over said barrier;
   b) controlling a time allowed for said movement of electrophoretic particles over said barrier; and
   c) controlling an effective width of the address electrode that controls said movement of electrophoretic particles over said barrier, such that said width is controlled by a number of electrodes composing the address electrode that controls said movement of electrophoretic particles over said barrier.

42. An electronic display comprising:
   a) at least one hollow tube to form structure within said electronic display;
   b) an electrophoretic material contained within said hollow tube, wherein said electrophoretic material can be electrically addressed; and
   c) at least one drive electrode to address said electrophoretic material;
   wherein said hollow tube is sandwiched between two plates to form said electronic display; and
   wherein at least one of said plates is coated with a conductive film.

43. An electronic display comprising:
   a) at least one hollow tube to form structure within said electronic display;
   b) an electrophoretic material contained within said hollow tube, wherein said electrophoretic material can be electrically addressed; and
   c) at least one drive electrode to address said electrophoretic material;
   wherein a plurality of particles in said electrophoretic material are colored to add color to the electronic display.

44. An electronic display comprising:
a) at least one hollow tube to form structure within said electronic display;
b) an electrophoretic material contained within said hollow tube, wherein said electrophoretic material can be electrically addressed; and
c) at least one drive electrode to address said electrophoretic material;
   wherein a colorant is added to the liquid which suspends a plurality of particles in said electrophoretic material to add color to the electronic display.

45. An electronic display comprising:
a) at least one hollow tube to form structure within said electronic display;
b) an electrophoretic material contained within said hollow tube, wherein said electrophoretic material can be electrically addressed; and
c) at least one drive electrode to address said electrophoretic material;
   wherein said hollow tube comprises an absorbing material such that said absorbing material serves as a black matrix; and
   wherein said hollow tube comprises an interlocking mechanism such that a light transmission between at least two hollow tubes is blocked.

46. An electronic display comprising:
a) at least one hollow tube to form structure within said electronic display;
b) an electrophoretic material contained within said hollow tube, wherein said electrophoretic material can be electrically addressed; and
c) at least one drive electrode to address said electrophoretic material;
   wherein said hollow tube comprises an absorbing material such that said absorbing material serves as a black matrix; and
   wherein said hollow tube comprises a slanted side wall such that a light transmission between at least two hollow tubes is blocked.

47. An electronic display comprising:
a) at least one hollow tube to form structure within said electronic display;
b) an electrophoretic material contained within said hollow tube, wherein said electrophoretic material can be electrically addressed; and
c) at least one drive electrode to address said electrophoretic material;
   wherein a reflective material is coated on at least a portion of said hollow tube to assist in the reflectivity of said electronic display; and
   wherein said reflective material is conductive and serves as a planar drive electrode in said electronic display.

* * * * *